(12) United States Patent
Pepe (10) Patent No.: US 11,451,402 B1
(45) Date of Patent: Sep. 20, 2022

(54) COLD STORAGE CRYPTOGRAPHIC AUTHENTICATION APPARATUS AND SYSTEM

(71) Applicant: IPAssets Technology Holdings Inc., Mesa, AZ (US)

(72) Inventor: Douglas J. Pepe, Atlantic Highlands, NJ (US)

(73) Assignee: IPAssets Technology Holdings Inc., Mesa, AZ (US)

( * ) Notice: Subject to any disclaimer, the term of this patent is extended or adjusted under 35 U.S.C. 154(b) by 0 days.

(21) Appl. No.: 17/389,317

(22) Filed: Jul. 29, 2021

(51) Int. Cl.
*H04L 9/00* (2022.01)
*H04L 9/32* (2006.01)
*G06K 19/06* (2006.01)

(52) U.S. Cl.
CPC ...... *H04L 9/3247* (2013.01); *G06K 19/06009* (2013.01); *H04L 9/3231* (2013.01); *H04L 9/3239* (2013.01); *H04L 9/50* (2022.05)

(58) Field of Classification Search
CPC ... H04L 9/3247; H04L 9/3231; H04L 9/3239; H04L 2209/38; G06K 19/06009
USPC .......................................................... 713/176
See application file for complete search history.

(56) References Cited

U.S. PATENT DOCUMENTS

| | | | |
|---|---|---|---|
| 7,076,062 B1 * | 7/2006 | Spies | H04L 9/3234 380/277 |
| 8,041,957 B2 | 10/2011 | Michaelis et al. | |
| 8,225,110 B2 | 7/2012 | Stahl et al. | |
| 8,966,268 B2 * | 2/2015 | Marien | H04L 9/32 713/172 |
| 9,185,111 B2 | 11/2015 | Corella et al. | |
| 9,444,623 B2 | 9/2016 | Kocher et al. | |
| 10,149,159 B1 | 12/2018 | Perfitt | |
| 10,212,140 B2 | 2/2019 | Blomqvist | |
| 10,277,400 B1 | 4/2019 | Griffin et al. | |
| 10,389,535 B2 | 8/2019 | Fiege et al. | |
| 10,469,259 B1 * | 11/2019 | Fox | H04L 9/0643 |
| 10,491,402 B2 | 11/2019 | Kaehler | |
| 10,671,712 B1 | 6/2020 | Lindley et al. | |
| 10,833,862 B2 | 11/2020 | Meng | |
| 10,861,009 B2 | 12/2020 | Lakshmanan et al. | |
| 10,999,260 B1 * | 5/2021 | Silvestri | H04L 9/0825 |
| 2002/0186838 A1 * | 12/2002 | Brandys | H04L 9/3231 380/30 |

(Continued)

*Primary Examiner* — Josnel Jeudy
(74) *Attorney, Agent, or Firm* — Gregory Finch; Finch Paolino, LLC (57) ABSTRACT

A secure cryptographic cold storage apparatus and system. Embodiments of the present disclosure provide for a cold storage apparatus configured to generate a private key, compute an associated PK/PKY and display the latter on a visual display screen. An associated interface apparatus is configured to retrieve the PK/PKH optically and store it in memory. The interface apparatus is configured to produce an associated message and render it at a visual display. The cold storage apparatus may retrieve the message optically, and cryptographically sign the message utilizing one or more public key cryptography methods. The cold storage apparatus produces a graphical output comprising the signed message and renders it at the visual display. The interface apparatus retrieves the signed message and verifies that the cold storage apparatus signed the message, utilizing the public key cryptography methods.

1 Claim, 9 Drawing Sheets

(56) References Cited

U.S. PATENT DOCUMENTS

| | | |
|---|---|---|
| 2004/0133784 A1 | 7/2004 | Tonnesland et al. |
| 2006/0095771 A1 | 5/2006 | Appenzeller et al. |
| 2019/0286805 A1* | 9/2019 | Law .................... G06F 21/34 |
| 2019/0354970 A1 | 11/2019 | Di Iorio et al. |
| 2021/0083872 A1 | 3/2021 | Desmarais et al. |
| 2021/0119781 A1* | 4/2021 | Liu .................... H04L 9/3239 |
| 2021/0357914 A1* | 11/2021 | Silvestri ............. H04L 9/3239 |

\* cited by examiner

COLD STORAGE CRYPTOGRAPHIC AUTHENTICATION APPARATUS AND SYSTEM

FIELD

The present disclosure relates to the field of cryptographic security systems; in particular, a system and method for secure authentication utilizing a cold cryptographic storage signature apparatus and system.

BACKGROUND

As use of blockchain technologies becomes more prevalent, greater attention is brought to computer security issues when dealing with transactions involving blockchain assets. Blockchain assets may include any one or more of cryptocurrencies (e.g., Bitcoin), stocks of a company or shares, ownership interests in, or access rights to, any other type of assets, financial products (e.g., bonds, debt securities, options, futures and other derivatives), stored data of various types (e.g., a document, records, logs, etc.), proof of identity, travel or government documents, licenses, and an interest in a smart contractual agreement. These assets are characterized as being transacted using blockchain technologies. Blockchain technologies include a distributed ledger performed by various computers independently checking the integrity of transactions in a decentralized way.

Blockchain assets typically require the use of cryptographic keypairs in order to transact. These keypairs consist of a private key, which is kept secret, and a mathematically-derived public key (and associated address), that can be revealed to the public. Maintaining the secrecy of private keys, or the seed or other information from which private keys are derived, is critical to securing a holder's interest in a blockchain asset from theft or confiscation by third parties. Certain methods for managing blockchain wallets and assets include use a "hot" wallet, which stores a user's private keys or seed information on an internet-accessible device. These wallets can range from desktop applications to mobile applications to web-based portals. While hot wallets provide convenience in terms of ease of use, hot wallets possess security issues due to the risk of hacking or theft and the inherent vulnerability of internet communication protocols. Security is greatly enhanced by storing all private information, including cryptographic private keys and seed information from which those keys are detived, on a "cold storage" device (i.e., a device without internet connectivity. By storing offline, the user protects itself from potential compromise of hot storage systems. However, cold storage solutions can be difficult to implement and require considerable effort to set up and execute a trade of a blockchain asset.

Through applied effort, ingenuity, and innovation, Applicant has identified a number of deficiencies and problems with cold storage devices and systems. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for a cold digital storage apparatus comprising a computing module comprising at least one processor and a non-transitory computer readable medium communicably engaged with the at least one processor; an output device communicably engaged with the computing module, the output device comprising a visual display; an input device communicably engaged with the computing module, the input device comprising a touchscreen or a keypad; and a camera communicably engaged with the computing module, wherein the camera is configured to capture a digital image; wherein the non-transitory computer readable medium comprises instructions stored thereon that, when executed, cause the at least one processor to perform one or more operations, the one or more operations comprising: generating a cryptographic public-private keypair; displaying, via the output device, a public key or a public key hash associated with the public-private keypair; receiving, via the camera, a cryptographic message from an interface device comprising the public key or the public key hash; verifying the cryptographic message data according to the cryptographic public-private keypair; signing the cryptographic message in response to successfully verifying the cryptographic message data according to the cryptographic public-private keypair; generating a signed cryptographic message according to the cryptographic public-private keypair; concatenating a hash of one or more user identity data with the signed cryptographic message; and generating a machine-readable optical code comprising concatenated data comprising the signed cryptographic message and the one or more user identity data.

In accordance with certain embodiments, the one or more operations may further comprise generating a machine-readable optical code comprising the public key or the public key hash. In certain embodiments, the cryptographic message from the interface device may comprise a machine-readable optical code comprising the public key or the public key hash. In certain embodiments, the one or more operations may further comprise verifying a user identity according to one or more user identity data. In certain embodiments, the one or more operations may further comprise concatenating a hash of one or more verified user identity data with the signed cryptographic message. In accordance with certain embodiments, the input device comprises at least one biometric sensor. In certain embodiments, the one or more operations may further comprise processing at least one biometric input from the at least one biometric sensor or the camera. In certain embodiments, the one or more operations further comprise verifying the identity of at least one user in response to processing the at least one biometric input from the at least one biometric sensor or the camera. In certain embodiments, the one or more operations further comprise associating the identity of the at least one user with the public key or the public key hash.

Further aspects of the present disclosure provide for a cold storage system comprising a cold storage apparatus comprising a first computing module, a first non-transitory memory device, a first input/output interface and a first camera; and an interface apparatus comprising a second computing module, a second non-transitory memory device, a second input/output interface and a second camera, wherein the cold storage apparatus is operably configured to generate a cryptographic public-private keypair and display a public key or a public key hash associated with the public-private keypair, wherein the interface apparatus is operably configured to receive the public key or the public key hash, store the public key or the public key hash in the second non-transitory memory device and process the public key or the public key hash via the second computing module to operably pair the interface apparatus with the cold storage apparatus, wherein operably pairing the interface apparatus with the cold storage apparatus comprises receiving and verifying one or more user identity data with the cold storage apparatus, and concatenating a hash of a verified user identity with the cold storage apparatus.

In accordance with certain embodiments, the interface apparatus is operably configured to generate a cryptographic message comprising the public key or the public key hash and generate a visual display of the cryptographic message at the second input/output interface. In certain embodiments, the cold storage apparatus is operably configured to scan the cryptographic message with the first camera. In certain embodiments, the cold storage apparatus is operably configured to process the cryptographic message with the first computing module and cryptographically sign the cryptographic message. In certain embodiments, the cold storage apparatus is operably configured to display a cryptographically signed message at the first input/output interface. In certain embodiments, the interface apparatus is operably configured to scan the cryptographically signed message with the second camera and process the cryptographically signed message with the second computing module to authenticate the cryptographically signed message.

Still further aspects of the present disclosure provide for a cold storage system comprising a cold storage apparatus comprising a first computing module, a first non-transitory memory device, a first input/output interface, a first optical sensor and at least one biometric sensor; and an interface apparatus comprising a second computing module, a second non-transitory memory device, a second input/output interface and a second optical sensor, wherein the cold storage apparatus is operably configured to generate a cryptographic public-private keypair and display a public key or a public key hash associated with the public-private keypair, wherein the interface apparatus is operably configured to receive the public key or the public key hash, store the public key or the public key hash in the second non-transitory memory device and process the public key or the public key hash via the second computing module to operably pair the interface apparatus with the cold storage apparatus, wherein the cold storage apparatus is operably configured to receive at least one biometric data input from the at least one biometric sensor and verify the identity of at least one user according to the at least one biometric data input, wherein operably pairing the interface apparatus with the cold storage apparatus comprises concatenating a hash of a verified biometric data input with the cold storage apparatus.

In accordance with certain embodiments, the interface apparatus is operably configured to generate a cryptographic message comprising the public key or the public key hash and output the cryptographic message at the second input/output interface. In certain embodiments, the cold storage apparatus is operably configured to receive the cryptographic message at the first computing module and cryptographically sign the cryptographic message. In certain embodiments, the interface apparatus is operably configured to receive the cryptographically signed message at the second optical sensor and process the cryptographically signed message with the second computing module to authenticate the cryptographically signed message. In certain embodiments, the cold storage apparatus is operably configured to concatenate a signed hash comprising the biometric data input and the public key or the public key hash.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

It should be appreciated that all combinations of the concepts discussed in greater detail below (provided such concepts are not mutually inconsistent) are contemplated as being part of the inventive subject matter disclosed herein. It also should be appreciated that terminology explicitly employed herein that also may appear in any disclosure incorporated by reference should be accorded a meaning most consistent with the particular concepts disclosed herein.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Before the present invention and specific exemplary embodiments of the invention are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of the included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "an input" includes a plurality of such inputs and reference to "the signal" includes reference to one or more signals and equivalents thereof known to those skilled in the art, and so forth.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof.

Following below are more detailed descriptions of various concepts related to, and embodiments of, inventive methods, apparatuses and systems for secure authentication utilizing a cold cryptographic storage signature system. An exemplary system, method, and apparatus according to the principles herein may include a cold storage apparatus comprising a computing module, a storage drive, an output mechanism such as a screen, input mechanisms such as a touchscreen or keyboard/keypad, and a camera. The computing module of the cold storage apparatus may be configured to execute one or more cryptography algorithm or framework to generate a globally unique alpha-numeric identifier comprising a cryptographically secure "private key" and store the private key in a memory device of the computing module. The computing module of the cold storage apparatus may be further configured to execute the one or more cryptography algorithm or framework to generate one or more "public keys" or hash of the public key (together, the "PK/PKH") that are mathematically associated with the private key, such that possession of the private key and its relationship to the public key can be established and verified without disclosing the private key. These public and private keys may also comprise one or more master keys, such that a tree of child keypairs may be derived from them. The cold storage apparatus can regenerate any number of private/public keypairs, as needed. In accordance with certain aspects of the present disclosure, the cold storage apparatus has no physical or electromagnetic connection to any other device and is completely isolated from sharing any data through any means other than optically; for example, via a visual display screen or a free-space optical communication pathway. In accordance with certain aspects of the present disclosure, the cold storage apparatus can include a means to verify a user identity and pair the user identity with the public key of the cold storage apparatus via biometric identification data (e.g., fingerprint, retinal scanning technology, and the like) by taking a cryptographic hash of the biometric identification data and associating it with the PK/PKH through a cryptographic signature. In accordance with certain aspects of the present disclosure, the cold storage apparatus may be operably engaged with an interface apparatus comprising a means to generate and visually display a message (which may comprise any data known to the interface apparatus that the interface apparatus wishes to authenticate via the cold storage apparatus) and a means to receive data optically (e.g., via an integrated camera or optical sensor).

In accordance with certain exemplary embodiments of the present disclosure, a cold storage apparatus generates a private key, computes an associated PK/PKY and displays the latter on a visual display screen. The interface apparatus retrieves the PK/PKH visually and stores it in memory. This "pairs" the cold storage apparatus with the interface apparatus, such that any message signed by the private key of the cold storage apparatus can be verified by the interface apparatus (since the interface apparatus knows the PK/PKY). The interface apparatus produces the message and displays it visually. The cold storage apparatus retrieves the message visually, and cryptographically signs the message utilizing public key cryptography methods. The cold storage apparatus produces the signed output on its screen visually. The interface apparatus retrieves the signed output and verifies that the cold storage apparatus signed the message, utilizing public key cryptography methods. As an alternative to the visual exchange of information, the interface apparatus and cold storage apparatus can communicate via manual user input (e.g., a keypad input).

Certain benefits and advantages of the present disclosure include a secure cold storage cryptographic authentication system that it is hack proof without physical possession of a cold storage apparatus. One or more private keys are generated by the cold storage apparatus and never leave the cold storage apparatus. The cold storage apparatus lacks a connected pathway of any kind (e.g., WiFi, cellular, BLUETOOTH, near-field communication, data transfer bus, etc.) to retrieve the private keys. The private keys can be cryptographically secured using a strong passphrase as protection against attacks involving physical possession of the cold storage apparatus.

Various exemplary use cases for the secure cold storage cryptographic authentication system and method may include, but are not limited to, authorizing transactions, including cryptocurrency transactions; authenticating access to websites; authenticating access to devices, such as automobiles, doors and garage doors; signing legal documents; and proving identity.

Figure 1:
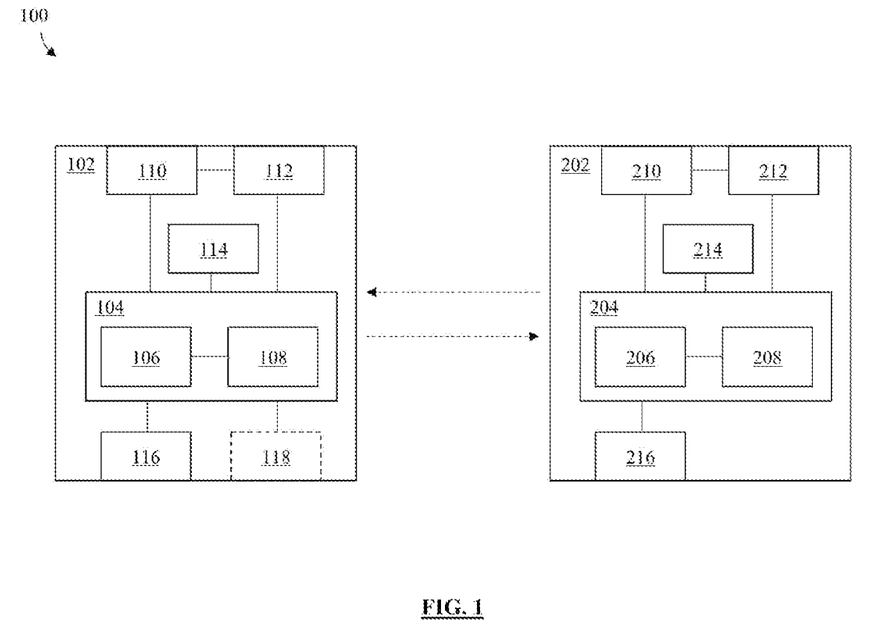
FIG. 1 is a system diagram of a cryptographic cold storage apparatus and system, in accordance with certain aspects of the present disclosure.

Turning now descriptively to the drawings, in which similar reference characters denote similar elements throughout the several views, FIG. 1 depicts a functional block diagram of a secure cryptographic cold storage system 100. In accordance with certain aspects of the present disclosure, system 100 comprises a cold storage apparatus ("CSA") 102 and an interface apparatus ("IA") 202. In accordance with certain embodiments, CSA 102 may comprise a computing module 104 comprising at least one processor 106 and a non-transitory computer readable memory device 108. Computing module 104 may be operably engaged with a power source 114 (e.g., a battery). Computing module 104 may be communicably engaged with at least one input device 110 (e.g., a touch screen, a keyboard, etc.) and an output device 112 (e.g., a visual display screen). Computing module 104 may also be communicably engaged with at least one camera 116 and, optionally, at least one biometric sensor 118 (e.g., a fingerprint scanner, a retinal scanner and the like). In accordance with certain embodiments, IA 202 may comprise an IA computing module 204 comprising an IA processor 206 and an IA non-transitory computer readable memory device 208. IA computing module 204 may be operably engaged with an IA power source 214 (e.g., a battery). IA computing module 204 may be communicably engaged with at least one IA input device 210 (e.g., a touch screen, a keyboard, etc.) and an IA output device 212 (e.g., a visual display screen). IA computing module 204 may also be communicably engaged with at least one IA camera 216. In accordance with various aspects of the present disclosure, IA 202 may be configured to scan a first graphical output generated at output device 112 of CSA 102 via IA camera 216. Likewise, CSA 102 may be configured to scan a second graphical output generated at IA output device 212 via camera 116; as described in more detail in FIG. 2, below.

Figure 2:
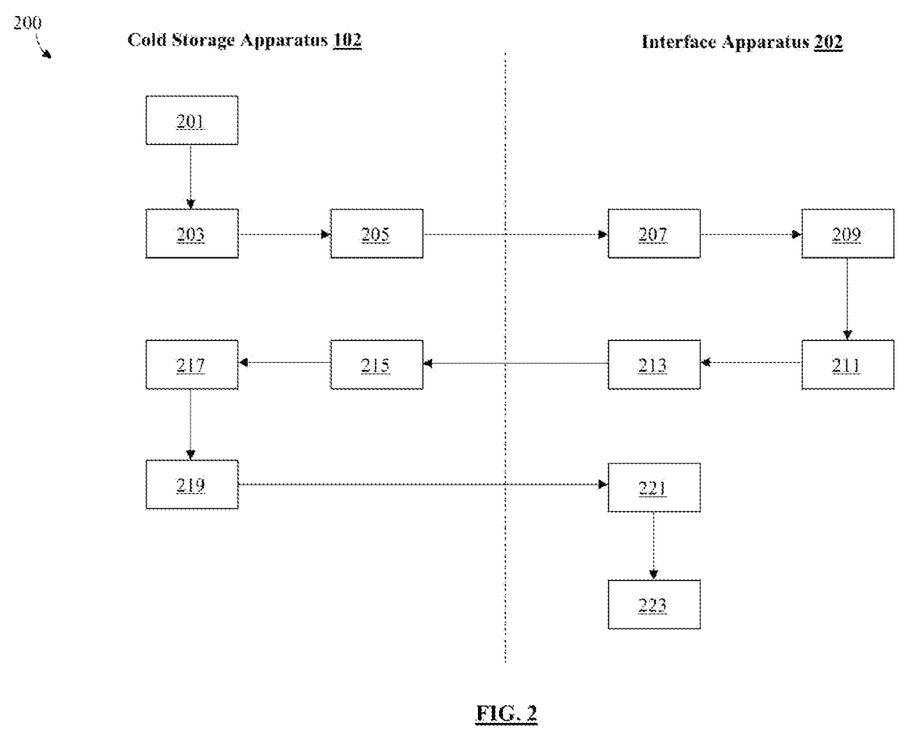
FIG. 2 is a functional block diagram of a cryptographic cold storage system, in accordance with certain aspects of the present disclosure.

Referring now to FIG. 2 (with additional reference to FIG. 1), a functional block diagram of a system routine 200 of a cryptographic cold storage system 100 (as shown in FIG. 1) is shown. In accordance with certain aspects of the present disclosure, cold storage apparatus 102 and interface apparatus 202 are operably configured to executed one or more steps or operations 201-223 comprising routine 200 for secure cold storage cryptographic authentication. In accordance with certain embodiments, Steps 201-223 may be embodied as processor-executable instructions stored on non-transitory computer readable memory device 108 of cold storage apparatus 102 and/or IA non-transitory computer readable memory device 208 of interface apparatus 202.

In accordance with certain aspects of the present disclosure, routine 200 comprises one or more steps or operations for generating, with cold storage apparatus 102, a globally unique alpha-numeric identifier comprising a private key according to one or more cryptographic algorithm or framework (Step 201). Routine 200 may continue by executing one or more steps or operations for computing, with cold storage apparatus 102, an associated private key or private key hash (PK/PKH) comprising a keypair for the private key according to the one or more cryptographic algorithm or framework (Step 203). Routine 200 may continue by executing one or more steps or operations for rendering a graphical output the PK/PKH at a display device of cold storage apparatus 102 (Step 205). In certain embodiments, the display device is output device 112 of cold storage apparatus 102. In certain embodiments, the PK/PKH is rendered in a machine-readable optical code format (e.g., a quick-response code). In certain embodiments, the PK/PKH is rendered in a human-readable format (e.g., an alpha-numeric string). Routine 200 may continue by executing one or more steps or operations for scanning, with a camera of interface apparatus 202, the PK/PKH displayed at the display device of cold storage apparatus 102 (Step 207). In certain embodiments, the camera may comprise IA camera 216 of interface apparatus 202. Routine 200 may continue by executing one or more steps or operations for storing, with a memory device of interface apparatus 202, the PK/PKH and associating the PK/PKH with cold storage apparatus 102 (Step 209). Step 209 may be configured to "pair" cold storage apparatus 102 and interface apparatus 202, such that any message signed by the private key of cold storage apparatus 102 can be verified by interface device 202.

In accordance with certain aspects of the present disclosure, routine 200 may continue by executing one or more steps or operations for producing a message with the computing module of interface device 202 (Step 211). In certain embodiments, the computing module is IA computing module 204 of interface apparatus 202. Routine 200 may proceed by executing one or more steps or operations for rendering a graphical output of the message at a display device of interface apparatus 202 (Step 213). In certain embodiments, the display device is IA output device 212 of interface apparatus 202. In certain embodiments, the message is rendered in a machine-readable optical code format (e.g., a quick-response code). Routine 200 may continue by executing one or more steps or operations for scanning the message rendered at the display device of interface apparatus 202 with a camera of cold storage apparatus 102 (Step 215). In certain embodiments, the camera is camera 116 of cold storage apparatus 102. Routine 200 may continue by executing one or more steps or operations for processing the message, with the computing module of cold storage apparatus 102, and cryptographically signing the message according to the one or more cryptographic algorithm or framework (Step 217). Routine 200 may continue by executing one or more steps or operations for rendering a graphical output the signed message at the display device (e.g., output device 112) of cold storage apparatus 102 (Step 219). In certain embodiments, the signed message is rendered in a machine-readable optical code format (e.g., a quick-response code). In certain embodiments, the signed message is rendered in a human-readable format (e.g., an alpha-numeric string). Routine 200 may continue by executing one or more steps or operations for retrieving the signed message/output with interface apparatus 202 (Step 221) and verifying, according to the one or more cryptographic algorithm or framework, that cold storage apparatus 102 signed the message (Step 223). In certain embodiments, as an alternative to scanning a graphical output with a camera of cold storage apparatus 102 and/or interface apparatus 202, cold storage apparatus 102 and/or interface apparatus 202 may receive data associated with a user-generated input via input device 110 and/or IA input device 210.

Figure 3A:
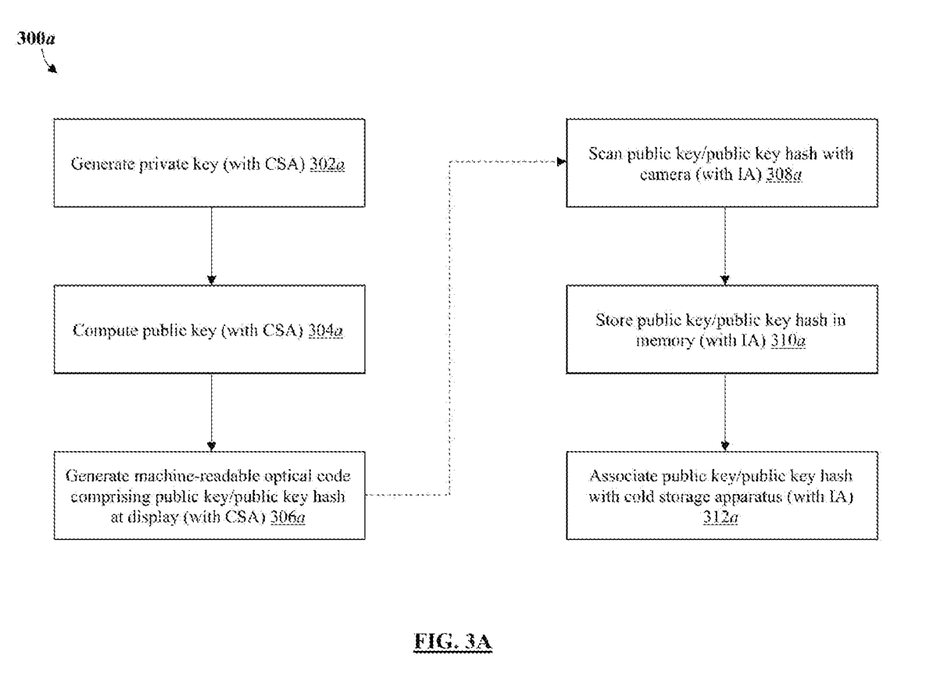
FIGS. 3A-3C are process flow diagrams of a pairing process for a cryptographic cold storage system, in accordance with certain aspects of the present disclosure.
Figure 3B:
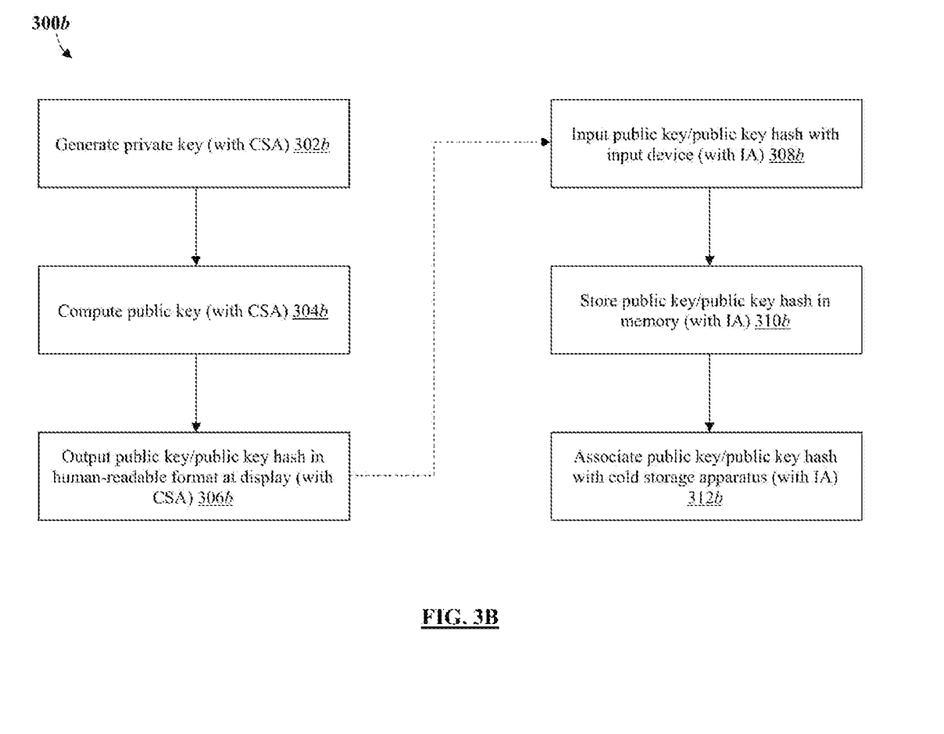
Figure 3C:
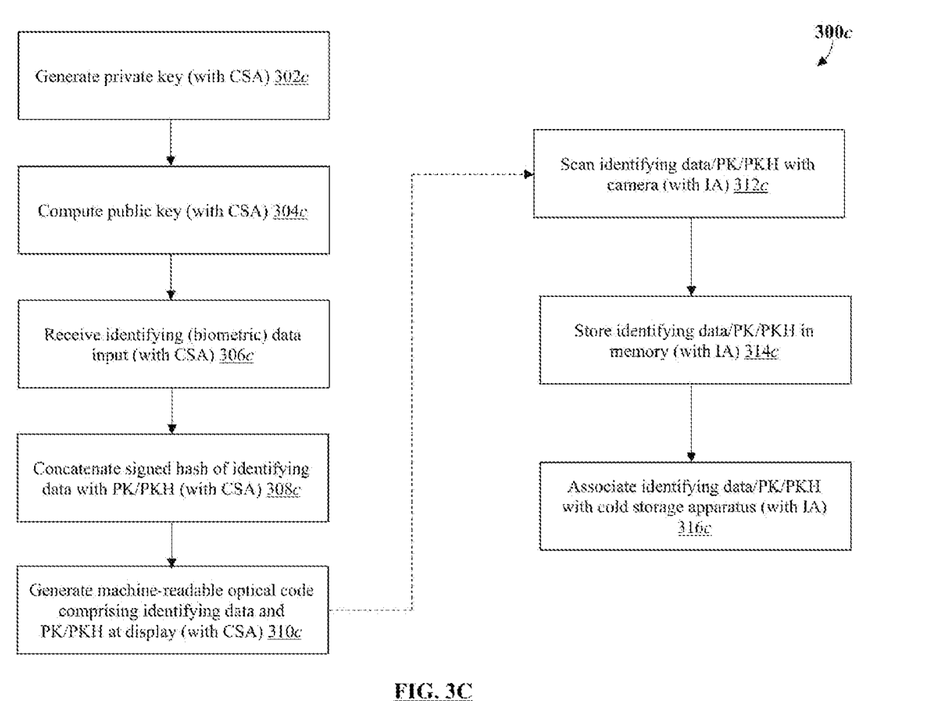

Referring now to FIGS. 3A-3C, process flow diagrams of routines 300a-300c for pairing a cold storage device (e.g., cold storage apparatus 102 as shown in FIG. 1) and an interface device (e.g., interface apparatus 202 as shown in FIG. 1) within a cryptographic cold storage system (e.g., system 100 as shown in FIG. 1) are shown. In accordance with certain aspects of the present disclosure, routines 300a-300c may be sequential to one or more steps or operations of routine 200 (as shown in FIG. 2) and/or may comprise one or more sub-steps or sub-routines of routine 200.

In accordance with certain aspects of the present disclosure, routine 300*a* may comprise one or more steps or operations for pairing a cold storage device and an interface device via a camera and a machine-readable optical code. In accordance with certain embodiments, routine 300*a* may be initiated by executing one or more steps or operations for computing a private key (Step 302*a*) and a public key or public key hash (Step 304*a*) according to a cryptographic algorithm and/or framework via the cold storage device. The private key and the public key or public key hash may comprise a public-private keypair within the cryptographic algorithm and/or framework. Routine 300*a* may proceed by executing one or more steps or operations for generating a machine-readable optical code comprising the PK/PKH at a visual display of the cold storage device (Step 306*a*). In accordance with certain embodiments, routine 300*a* may proceed by executing one or more steps or operations for scanning the machine-readable optical code comprising the PK/PKH from the visual display of the cold storage device via a camera of the interface device (Step 308*a*). Routine 300*a* may proceed by executing one or more steps or operations for storing the PK/PKH in a non-transitory computer readable medium of the interface device (Step 310*a*) and associating the PK/PKH with the cold storage device (Step 312*a*). In accordance with certain aspects of the present disclosure, upon the completion of Steps 302*a*-312*a*, cold storage device and interface device are operably paired within the cryptographic cold storage system.

In accordance with certain aspects of the present disclosure, routine 300*b* may comprise one or more steps or operations for pairing a cold storage device and an interface device via a user-generated input. In accordance with certain embodiments, routine 300*b* may be initiated by executing one or more steps or operations for computing a private key (Step 302*b*) and a public key or public key hash (Step 304*b*) according to a cryptographic algorithm and/or framework via the cold storage device. The private key and the public key or public key hash may comprise a public-private keypair within the cryptographic algorithm and/or framework. Routine 300*b* may proceed by executing one or more steps or operations for outputting the PK/PKH in a human-readable format (e.g., an alpha-numeric string) at a visual display of the cold storage device (Step 306*b*). In accordance with certain embodiments, routine 300*a* may proceed by executing one or more steps or operations for receiving a user-generated input comprising the PK/PKH alpha-numeric string via an input means of the interface device (Step 308*b*). Routine 300*b* may proceed by executing one or more steps or operations for storing the PK/PKH in a non-transitory computer readable medium of the interface device (Step 310*b*) and associating the PK/PKH with the cold storage device (Step 312*b*). In accordance with certain aspects of the present disclosure, upon the completion of Steps 302*b*-312*b*, cold storage device and interface device are operably paired within the cryptographic cold storage system.

In accordance with certain aspects of the present disclosure, routine 300*c* may comprise one or more steps or operations for pairing a cold storage device and an interface device via a biometric sensor, a camera and a machine-readable optical code. In accordance with certain embodiments, routine 300*c* may be initiated by executing one or more steps or operations for computing a private key (Step 302*c*) and a public key or public key hash (Step 304*c*) according to a cryptographic algorithm and/or framework via the cold storage device. The private key and the public key or public key hash may comprise a public-private keypair within the cryptographic algorithm and/or framework. Routine 300*c* may proceed by executing one or more steps or operations for receiving user identification data (e.g., a fingerprint) via at least one biometric sensor of the cold storage device (Step 306*c*). In accordance with certain embodiments, routine 300*c* may proceed by executing one or more steps or operations for concatenating a signed hash of the user identification data with the PK/PKH according to the cryptographic algorithm and/or framework (Step 308*c*). Routine 300*c* may proceed by generating a machine-readable optical code comprising the signed hash of the user identification data and the PK/PKH at a visual display of the cold storage device (Step 306*c*). In accordance with certain embodiments, routine 300*c* may proceed by executing one or more steps or operations for scanning the machine-readable optical code comprising the signed hash of the user identification data and the PK/PKH from the visual display of the cold storage device via a camera of the interface device (Step 308*c*). Routine 300*c* may proceed by executing one or more steps or operations for storing the signed hash of the user identification data and PK/PKH in a non-transitory computer readable medium of the interface device (Step 310*c*) and associating the signed hash of the user identification data and the PK/PKH with the cold storage device (Step 312*c*). In accordance with certain aspects of the present disclosure, upon the completion of Steps 302*c*-316*c*, cold storage device and interface device are operably paired within the cryptographic cold storage system.

Figure 4:
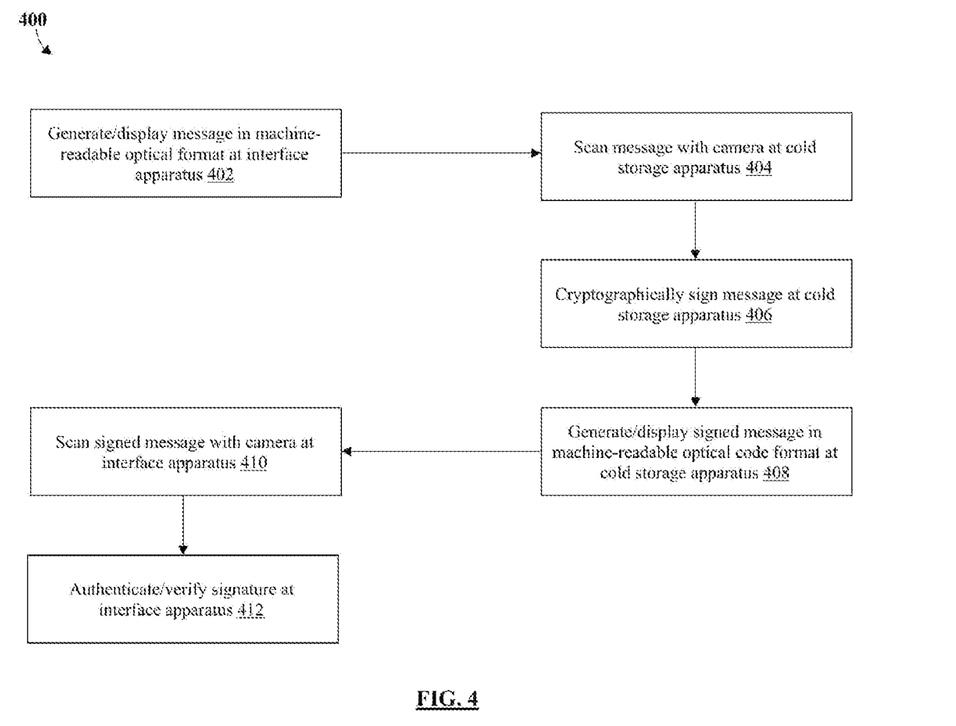
FIG. 4 is a process flow diagram of an authentication process for a cryptographic cold storage system, in accordance with certain aspects of the present disclosure.

Referring now to FIG. 4, a process flow diagram of an authentication routine 400 within a cryptographic cold storage system is shown. In accordance with certain aspects of the present disclosure, the cryptographic cold storage system may comprise cryptographic cold storage system 100, as shown in FIG. 1. In accordance with certain aspects of the present disclosure, routine 400 may be sequential to one or more steps or operations of routine 200 (as shown in FIG. 2) and/or routines 300*a*-300*c* (as shown in FIGS. 3A-3C) and/or may comprise one or more sub-steps or sub-routines of routine 200 and/or routines 300*a*-300*c*.

In accordance with certain aspects of the present disclosure, routine 400 may be initiated by executing one or more steps or operations for generating a message at a display of an interface apparatus (e.g., interface apparatus 202 of FIG. 1) (Step 402). In certain embodiments, the message may be formatted as a machine-readable optical code (e.g., a quick response code). Routine 400 may proceed by executing one or more steps or operations for scanning the message with a camera of a cold storage apparatus (e.g., cold storage apparatus 102 of FIG. 1) (Step 404). Routine 400 may proceed by executing one or more steps or operations for cryptographically signing the message via a cryptographic algorithm or framework executing on a computing module of the cold storage apparatus (Step 406). Routine 400 may proceed by executing one or more steps or operations for generating a graphical output of the signed message at a visual display of the cold storage apparatus (Step 408). In accordance with certain embodiments, the signed message may include user identification data comprising a biometric sensor input. In embodiments where user identification data pairing is used, a hash of the user identification data is concatenated with the signed message. In accordance with certain embodiments, the graphical output of the signed message may be formatted as a machine-readable optical code. In certain embodiments, the graphical output of the signed message may be formatted as a human-readable alpha-numeric string. Routine 400 may proceed by executing one or more steps or operations for scanning the signed message with a camera of the interface apparatus (Step 410).

Routine 400 may proceed by executing one or more steps or operations for authenticating and/or verifying the signature from the cold storage device via the interface apparatus. In accordance with certain embodiments, human-readable alpha-numeric format may be substituted for machine-readable optical code format and manual, user-generated input may be substituted for scanned input from the camera(s).

Figure 5:
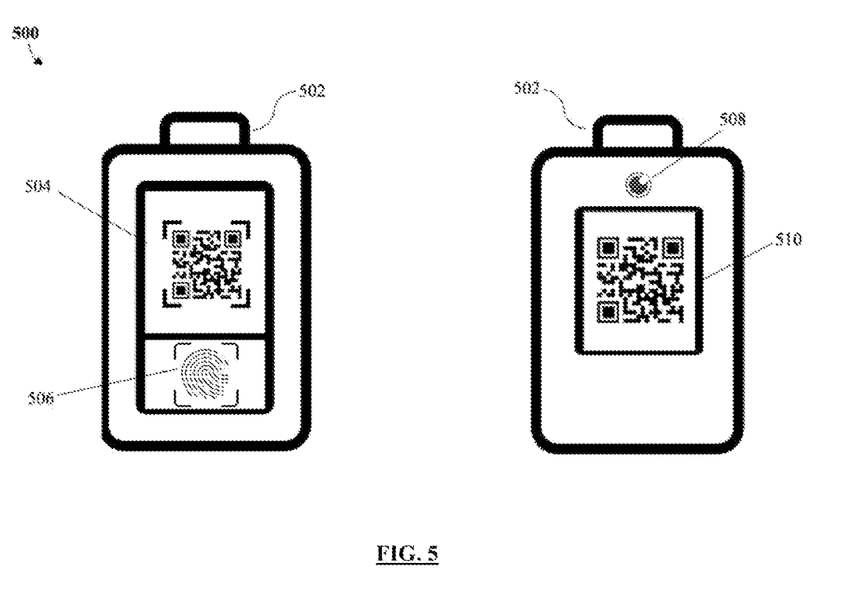
FIG. 5 is a functional diagram of a cryptographic cold storage apparatus, in accordance with certain aspects of the present disclosure.

Referring now to FIG. 5, a functional diagram of a cryptographic cold storage apparatus 500 is shown. In accordance with certain aspects of the present disclosure, cryptographic cold storage apparatus 500 may be embodied as cold storage apparatus 102, as shown in FIG. 1. In accordance with certain embodiments, an exemplary form-factor of cryptographic cold storage apparatus 500 may comprise a hand-held housing 502 comprising a first surface comprising a user-interface screen 504 and an optional biometric sensor 506. In certain embodiments, biometric sensor 506 may comprise a fingerprint scanner. Cryptographic cold storage apparatus 500 may comprise a camera 508 and an output screen 510 disposed on a second surface of hand-held housing 502. In certain embodiments, user-interface screen 504 may be operably configured as a view finder of camera 508. In certain embodiments, output screen 510 may be configured to render a machine-readable optical code comprising a PK/PKH generated by a computing module of cryptographic cold storage apparatus 500.

Figure 6:
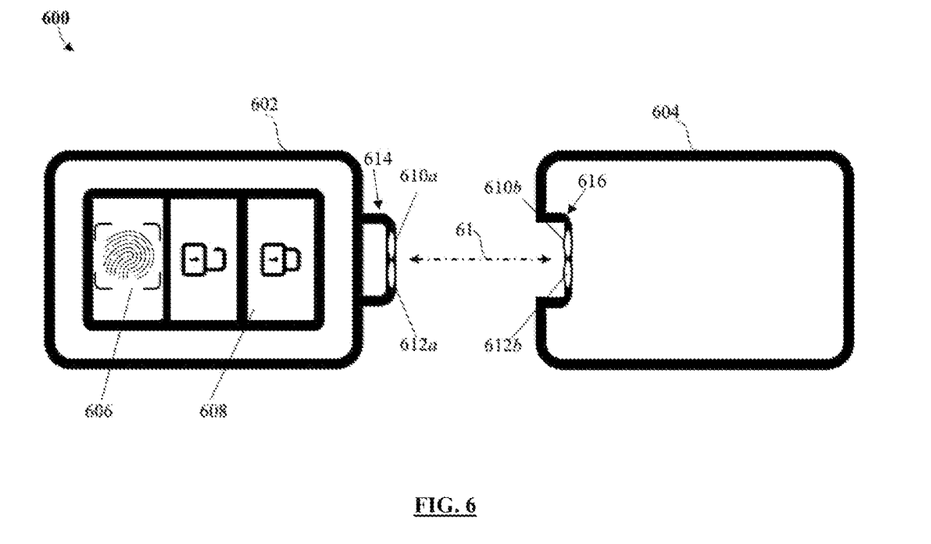
FIG. 6 is a functional diagram of a cryptographic cold storage system, in accordance with certain aspects of the present disclosure.

Referring now to FIG. 6, a functional diagram of a cryptographic cold storage system 600 is shown. In accordance with certain aspects of the present disclosure, cryptographic cold storage system 600 may be embodied as cryptographic cold storage system 100 of FIG. 1. In accordance with certain embodiments, cryptographic cold storage system 600 may comprise a cold storage apparatus 602 and an interface apparatus 604. In accordance with various aspects of the present disclosure, cold storage apparatus 602 may be embodied as cold storage apparatus 102 of FIG. 1 and interface apparatus 604 may be embodied as interface apparatus 202 of FIG. 1. An exemplary form-factor of cryptographic cold storage apparatus 602 may comprise a hand-held housing comprising an input/output device 608 and an optional biometric interface 606 disposed on a first surface of the hand-held housing. An exemplary form-factor of interface apparatus 604 may comprise a hand-held housing comprising a receiving portion 616 comprising an optical output device 610b (e.g., a laser or a light-emitting diode) and an optical sensor 612b (e.g., a photodiode). Cryptographic cold storage apparatus 602 may comprise a transmitter portion 614 disposed on an upper surface of the hand-held housing. In certain embodiments, transmitter portion 614 may comprise an optical output device 610a (e.g., a laser or a light-emitting diode) and an optical sensor 612a (e.g., a photodiode). In certain embodiments, a form-factor of cold storage apparatus 602 and interface apparatus 604 may be configured such that transmitter portion 614 may be mateably interfaced with receiving portion 616. In accordance with certain aspects of the present disclosure, cryptographic cold storage apparatus 602 may be communicably engaged with interface apparatus 604 via a free-space optical communication pathway 61. Optical output device 610a,b may be configured to modulate a visible light output comprising a data signal comprising the PK/PKH and/or a signed message from cryptographic cold storage apparatus 602, which may be received at optical sensor 612a,b.

Figure 7:
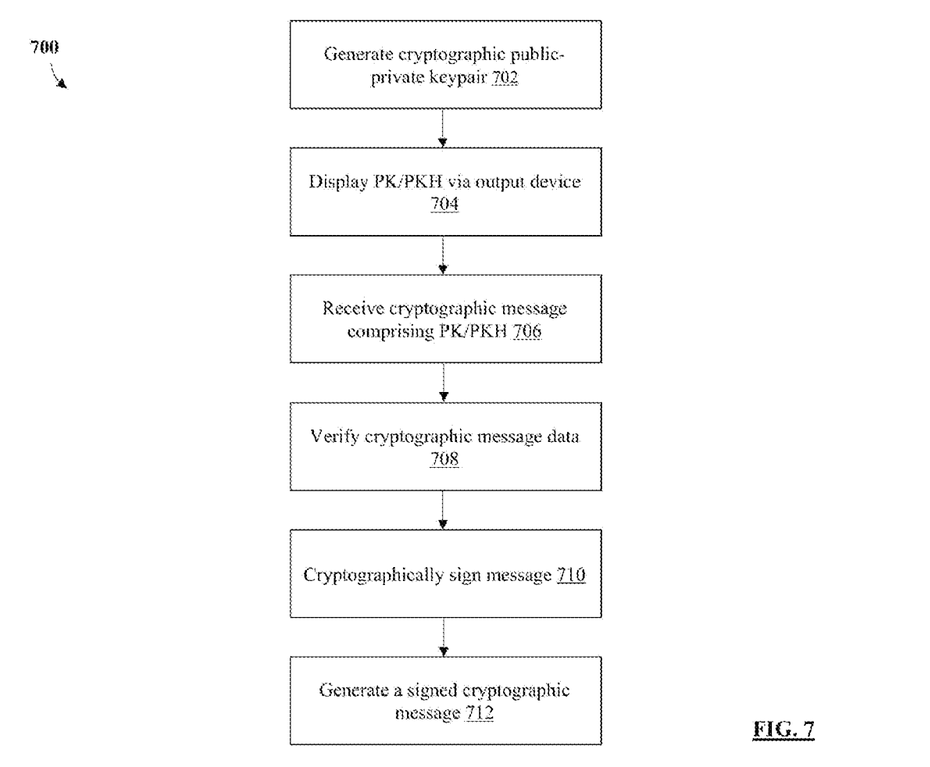
FIG. 7 is a process flow diagram of a cryptographic cold storage method, in accordance with certain aspects of the present disclosure.

Referring now to FIG. 7, a process flow diagram of a cryptographic cold storage method 700 is shown. In accordance with certain aspects of the present disclosure, method 700 may be embodied as one or more processor-executable instructions stored on a non-transitory computer readable medium of a cryptographic cold storage apparatus. In accordance with certain embodiments, the cryptographic cold storage apparatus may comprise cryptographic cold storage apparatus 102 of FIG. 1. In accordance with certain embodiments, method 700 may comprise one or more steps or operations for generating a cryptographic public-private keypair (Step 702). Method 700 may further comprise one or more steps or operations for displaying, via an output device of the cryptographic cold storage apparatus, a public key or a public key hash associated with the public-private keypair (Step 704). Method 700 may further comprise one or more steps or operations for receiving, via a camera of the cryptographic cold storage apparatus, a cryptographic message from an interface device comprising the public key or the public key hash (Step 706). Method 700 may further comprise one or more steps or operations for verifying the cryptographic message data according to the cryptographic public-private keypair (Step 708). Method 700 may further comprise one or more steps or operations for signing the cryptographic message in response to successfully verifying the cryptographic message data according to the cryptographic public-private keypair (Step 710). Method 700 may further comprise one or more steps or operations for generating a signed cryptographic message according to the cryptographic public-private keypair (Step 712).

In accordance with certain aspects of the present disclosure, method 700 may further comprise one or more steps or operations for generating a machine-readable optical code comprising the public key or the public key hash. In certain embodiments, the cryptographic message from the interface device may comprise a machine-readable optical code comprising the public key or the public key hash. In certain embodiments, method 700 may further comprise one or more steps or operations for verifying a user identity according to one or more user identity data (e.g., a biometric sensor input). In certain embodiments, method 700 may further comprise one or more steps or operations for concatenating a hash of one or more user identification data with a signed message. In certain embodiments, method 700 may further comprise one or more steps or operations for verifying the identity of at least one user in response to processing the at least one biometric input from the at least one biometric sensor or the camera. In certain embodiments, method 700 may further comprise one or more steps or operations for associating the identity of the at least one user with the public key or the public key hash.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium. In accordance with certain aspects of the present disclosure, any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory) or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A cold storage system comprising:
   a cold storage apparatus comprising a first computing module, a first non-transitory memory device, a first input/output interface and a first camera; and
   an interface apparatus comprising a second computing module, a second non-transitory memory device, a second input/output interface and a second camera,
   wherein the cold storage apparatus is operably configured to generate a cryptographic public-private keypair and display a public key or a public key hash associated with the public-private keypair,
   wherein the interface apparatus is operably configured to receive the public key or the public key hash, store the public key or the public key hash in the second non-transitory memory device and process the public key or the public key hash via the second computing module to operably pair the interface apparatus with the cold storage apparatus,
   wherein the interface apparatus is operably configured to generate a cryptographic message comprising the public key or the public key hash and generate a visual display of the cryptographic message at the second input/output interface, wherein the cold storage apparatus is operably configured to scan the cryptographic message with the first camera, wherein the cold storage apparatus is operably configured to process the cryptographic message with the first computing module and cryptographically sign the cryptographic message, wherein the interface apparatus is operably configured to scan the cryptographically signed message with the second camera and process the cryptographically signed message with the second computing module to authenticate the cryptographically signed message.

\* \* \* \* \*